United States Patent [19]

Kim

[11] Patent Number: 4,709,289

[45] Date of Patent: Nov. 24, 1987

[54] TAPE GUIDE CONSTRUCTION OF A HEAD DRUM OF A VIDEOCASSETTE RECORDER

[75] Inventor: Young H. Kim, Suwon, Rep. of Korea

[73] Assignee: Gold Star Co., Ltd., Seoul, Rep. of Korea

[21] Appl. No.: 883,783

[22] Filed: Jul. 9, 1986

[30] Foreign Application Priority Data

Jul. 9, 1985 [KR] Rep. of Korea ................. 8573/1985

[51] Int. Cl.[4] ............................................ G11B 15/61
[52] U.S. Cl. ............................................... 360/130.24
[58] Field of Search ................................... 360/130.24

[56] References Cited

U.S. PATENT DOCUMENTS

| 3,661,311 | 5/1972 | Warren | 360/130.24 |
| 4,348,706 | 9/1982 | Videc | 360/130.24 |
| 4,459,627 | 7/1984 | Kitagawa et al. | 360/130.24 |

*Primary Examiner*—Robert S. Tupper
*Attorney, Agent, or Firm*—Cushman, Darby & Cushman

[57] ABSTRACT

A tape guide construction of a head drum of a videocassette recorder comprising a circular wire fixedly engaged in a V-shaped groove formed at an outer peripheral surface of a lower drum of the head drum. A portion of the peripheral surface of the circular wire is disposed outside the V-shaped groove, whereby a tape is contacted at the lower edge thereof with and guided by the upper-protruded portion of the peripheral surface of the wire, during the travel thereof.

1 Claim, 6 Drawing Figures

TAPE GUIDE CONSTRUCTION OF A HEAD DRUM OF A VIDEOCASSETTE RECORDER

BACKGROUND OF THE INVENTION

The present invention relates to a head drum construction of a spiral scanning-type videocassette recorder wherein a tape guide is formed at an outer peripheral surface of a lower drum to accurately guide a magnetic recording tape being travelled round a head drum. More particularly, the present invention relates to an improved tape guide construction of a head drum of a videocassette recorder comprising a V-shaped groove helically formed at an outer peripheral surface of a lower drum and a circular wire fixedly engaged with the entire length of said groove, which construction enables the machining thereof to be easy and precise.

In a generally-used videocassette recorder, a magnetic recording tape is tracked by a video head mounted on a head drum to record and reproduce an image signal, while being helically travelled round an outer peripheral surface of said rotating head drum. In order to prevent upward and downward movements of the tape from the helical travelling path on the head drum during the travel of the tape along said travelling path, there are guide posts adapted to restrain the upper edge of the tape, at inlet and outlet of the head drum, respectively. And also, a tape guide is inclinedly formed, with a certain helix angle, at the outer peripheral surface of the lower drum of the head drum to restrain the lower edge of the tape.

FIGS. 1 and 2A illustrate an example of conventional tape guide construction wherein a guide plate 2 having a certain guide angle $\theta$ and a certain thickness D' is fixed to an outer peripheral surface of a lower drum 1 by means of an adhesive or a fixing screw. Where the guide plate 2 does not adhere closely to the lower drum 1, thereby to form a gap therebetween, a tape T may engage in said gap, thereby causing the travel thereof to be rough and unstable. And also, it is difficult to accurately set the desired guide angle $\theta$ in fixing the guide plate 2.

Another conventional construction is illustrated in FIG. 2B, wherein a tape guide 1a is integrally formed with a lower drum 1. In order to form the tape guide 1a, the lower drum 1 is chucked and rotated in a machining apparatus including a bite. As the bite is fed, the lower drum 1 is machined to form the tape guide 1a. In such machining work, the bite should be reciprocated about 200 times along a guide line, since the lead of the tape guide 1a is as long as about 10 mm. Such machining work should be also slowly carried out. As a result, a long machining time is needed, thereby causing the productivity to be poor.

SUMMARY OF THE INVENTION

Therefore, an object of the present invention is to provide an improved tape guide construction which can be precisely formed in a short time by using a simple machining work, in order to overcome the problems encountered in the above-mentioned prior arts.

In accordance with the present invention, this object is accomplished by providing a tape guide construction of a head drum of a videocassette recorder comprising a V-shaped groove helically formed, with a certain helix angle, at an outer peripheral surface of a lower drum of the head drum, said groove having certain included angle and width, and a circular wire fixedly engaged in the entire length of said groove, said wire having such diameter that a portion of the wire is disposed outside said groove, whereby a tape is contacted at the lower edge thereof with and guided by the upper-protruded portion of the peripheral surface of the wire, during the travel thereof.

Further objects and advantages of the present invention will be apparent from the following description of a preferred embodiment of the present invention which is shown in the accompanying drawings.

BRIEF DESCRIPTION OF THE DRAWINGS

FIGS. 2A and 2B are sectional views of another conventional tape guide construction, wherein FIG. 2A shows a tape guide fixedly adhered to a lower drum and FIG. 2B shows a tape guide integrally formed with a lower drum;

Referring to FIGS. 3 and 4, a tape guide construction of the present invention is shown. In accordance with the present invention, a tape guide 3 provided at an outer peripheral surface of a lower drum 1 of a head drum of a videocassette recorder comprises a V-shaped groove 1b helically formed, with a helix angle $\alpha$, at the outer peripheral surface of the lower drum 1. In the entire length of V-shaped groove 1b, a circular wire 3' having a certain diameter is fixedly engaged such that a portion of the peripheral surface thereof is disposed outside the groove 1b. Thus, a tape T is contacted at the lower edge thereof with and guided by the upper-protruded portion of the peripheral surface of the wire, during the travel thereof.

Figure 1:
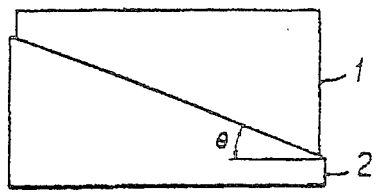
FIG. 1 is a side view of a conventional tape guide construction formed at a lower drum of a generally-used videocassette recorder.
Figure 2A:
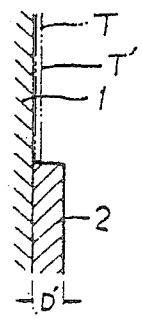
Figure 2B:
Figure 3:
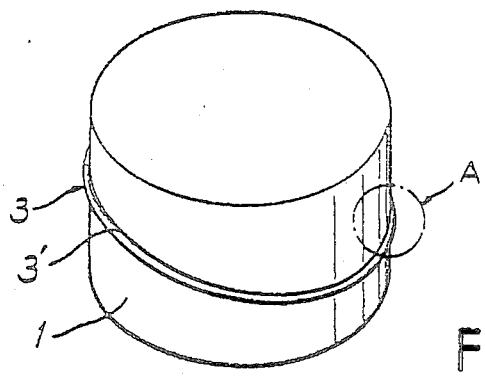
FIG. 3 is a perspective view of a tape guide construction in accordance with the present invention.
Figure 4:
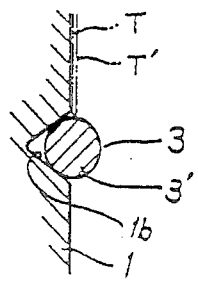
FIG. 4 is an enlarged sectional view of a part denoted by "A" in FIG. 3.
Figure 5:
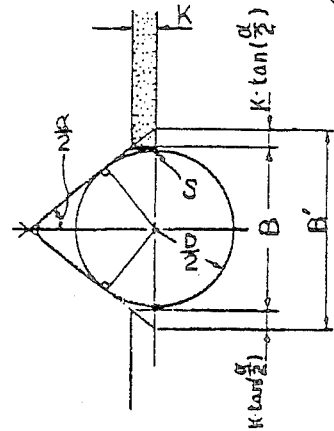
FIG. 5 is an enlarged sectional view explaining the construction of the present invention.

In order to provide a stable travel of the tape, it is preferred that the center O of the circular wire 3' fixedly engaged at the inner portion thereof in the groove 1b is in line with the outer surface T' of the tape T being travelled round the lower drum 1 so that the lower edge of the outer tape surface T' is contacted with an apex S of the wire 3', as shown in FIG. 5. Thus, if B denotes the width of the V-shaped groove 1b, $\alpha$ the included angle of the groove 1b, and K the thickness of the tape T, the diameter D of the ciruclar wire 3' becomes as follows:

$$D = B \cdot \cos \alpha/2 + 2K \cdot \tan \alpha/2 \cdot \cos \alpha/2$$

In accordance with the present construction wherein the tape guide 3 comprises the circular wire 3' fixedly engaged in the V-shaped groove 1b formed at the outer peripheral surface of the lower drum 1 of the head drum, the tape T which is guided by guide posts disposed at inlet and outlet of the head drum is contacted at the lower edge thereof with and helically guided by the upper portion of the peripheral surface of the wire 3'.

Since the V-shaped groove can be formed by a single pass of machining work, the tape guide construction of the present invention can be manufactured in a short time by a simple machining work, as compared with the prior art involving the machining work wherein a bite should be reciprocated about 200 times in order to form a tape guide. In view of the fact that the wire is fixedly engaged into the V-shaped groove, the adhesion condition between the tape guide elements is good, as compared with the prior art wherein a guide plate is simply attached to the lower drum. Thus, the tape can be accurately guided, during the travel thereof.

What is claimed is:

1. A tape guide construction of a head drum of a videocassette recorder comprising:

a V-shaped groove helically formed, with a certain helix angle, at an outer peripheral surface of a lower drum of the head drum, said groove having certain included angle and width; and a circular wire fixedly engaged in the entire length of said groove, said wire having such diameter that a portion of the peripheral surface of the wire is disposed outside said groove, whereby a tape is contacted at the lower edge thereof with and guided by the upper-protruded portion of the peripheral surface of the wire, during the travel thereof.

* * * * *